(12) United States Patent
Soryal et al.

(10) Patent No.: US 12,348,957 B2
(45) Date of Patent: Jul. 1, 2025

(54) CORE NETWORK TRANSFORMATION AUTHENTICATOR

(71) Applicant: AT&T Intellectual Property I, L.P., Atlanta, GA (US)

(72) Inventors: Joseph Soryal, Glendale, NY (US); Howard Lang, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

(21) Appl. No.: 17/499,391

(22) Filed: Oct. 12, 2021

(65) Prior Publication Data
US 2023/0112126 A1  Apr. 13, 2023

(51) Int. Cl.
*H04W 12/06* (2021.01)
*H04L 9/40* (2022.01)
*H04W 12/08* (2021.01)

(52) U.S. Cl.
CPC ........... *H04W 12/06* (2013.01); *H04L 63/083* (2013.01); *H04W 12/08* (2013.01)

(58) Field of Classification Search
CPC ...... H04W 12/08; H04W 12/06; H04L 63/083
See application file for complete search history.

(56) References Cited

U.S. PATENT DOCUMENTS

| | | | |
|---|---|---|---|
| 8,966,638 B2* | 2/2015 | Dey | H04W 12/128 726/28 |
| 2009/0254969 A1* | 10/2009 | Parker | G06F 21/554 726/1 |
| 2012/0144461 A1* | 6/2012 | Rathbun | G06Q 20/4014 726/5 |
| 2014/0337930 A1* | 11/2014 | Hoyos | G06F 21/34 726/4 |
| 2015/0350106 A1* | 12/2015 | Whalley | H04W 4/00 709/225 |
| 2017/0034003 A1* | 2/2017 | Shevach | H04L 41/12 |
| 2017/0111341 A1* | 4/2017 | Huh | G06F 16/9535 |
| 2017/0171256 A1* | 6/2017 | Liang | H04L 65/40 |

* cited by examiner

*Primary Examiner* — Steven S Kelley
(74) *Attorney, Agent, or Firm* — Guntin & Gust, PLC; Louis Yang (57) ABSTRACT

A system may use information obtained by a communication service provider's core network for multi-factor authentication.

20 Claims, 4 Drawing Sheets

CORE NETWORK TRANSFORMATION AUTHENTICATOR

BACKGROUND

Multi-factor authentication is an electronic authentication method in which a user is granted access to a website or application only after successfully presenting two or more pieces of evidence (or factors) to an authentication mechanism: knowledge (something only the user knows), possession (something only the user has), and inherence (something only the user is). Multi-factor authentication protects user data—which may include personal identification or financial assets—from being accessed by an unauthorized third party that may have been able to discover, for example, a single password.

This background information is provided to reveal information believed by the applicant to be of possible relevance. No admission is necessarily intended, nor should be construed, that any of the preceding information constitutes prior art.

SUMMARY

The disclosed subject matter may use information obtained by a communication service provider's core network for multi-factor authentication. In an example, an apparatus may include a processor and a memory coupled with the processor that effectuates operations. The operations may include receive, by a web server, an indication of an identification of a user associated with a user equipment; based on the indication of identification of the user, send, by the web server, an authentication request to secure server of a communications provider of the user equipment; in response to the authentication request, receiving, by the web server, an authentication response from the secure server of the communications provider; in response to the authentication response from the secure server, sending, by the web server, a notification to the user equipment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Often users use the same passwords for multiple websites as well as their email account. These passwords may be easily guessed or obtained by some other, usually nefarious, means. Once an illegitimate user obtains the password to a website and an email address of a legitimate user, the illegitimate user can be logged into the legitimate user's email account. If a PIN code is sent to an email, the illegitimate user may be able to access the PIN code without the legitimate user's knowledge. This is an example of how a conventional two factor authentication (2FA) may be compromised.

Third party security vendors provide two factor authentication (2FA) to websites. Herein, the subject matter discloses the use of a service provider core network as the second or third factor authenticator for websites or other internet services. The user experience may be enhanced by not only improving security, but also making authentication more "seamless" to a user wherever possible.

The network information that a service provider routinely collects as part of the user's interaction on the service provider's network may be used to develop a profile of the user. The network information may be location information, as well as other indicative behavioral information discovered through a user's pattern of usage of a user equipment. Anomalies associated with a user's pattern of use may be indicative of a compromised account and therefore a notification may be sent, and additional information may be requested before providing access to an account of a user. The core network may of the service provider may expose application programming interface (API) and the communication between the user equipment and the core network could be, among other mechanisms, via API queries and responses.

Figure 1:
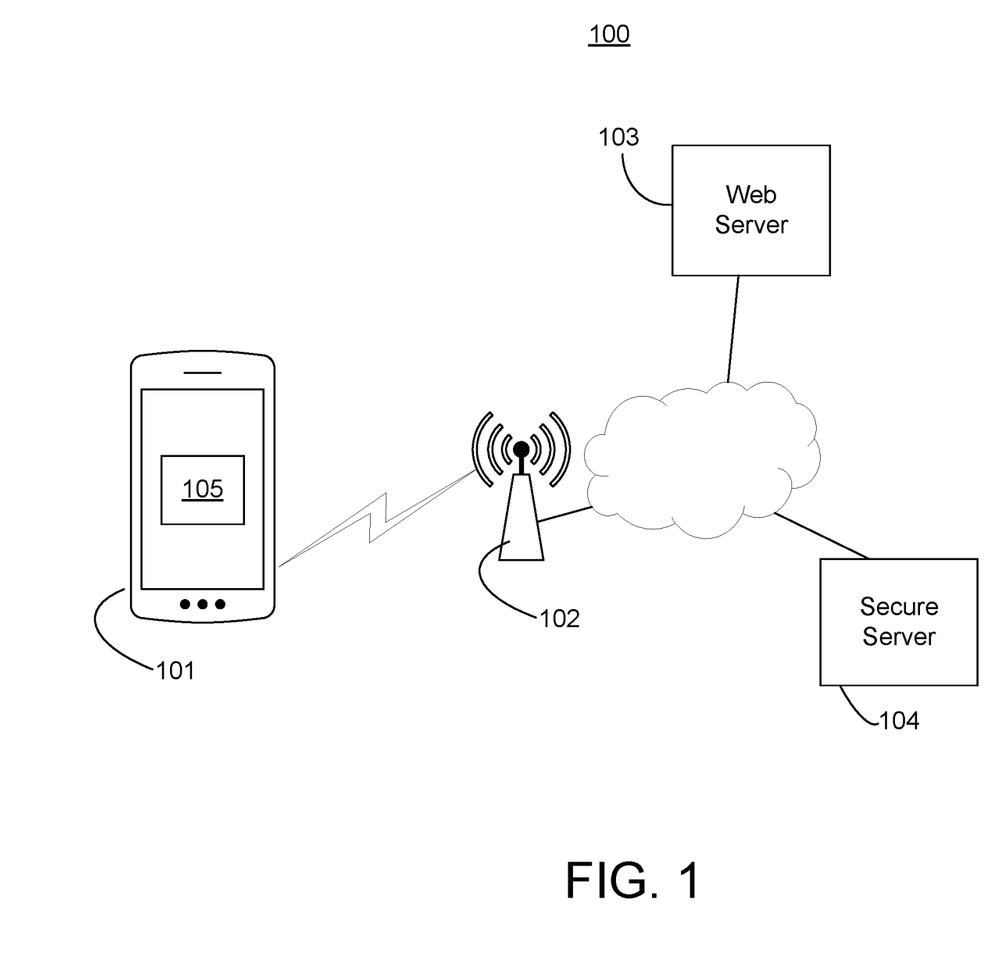
FIG. 1 illustrates an exemplary system for a core network authenticator.

FIG. 1 illustrates an exemplary system for a core network authenticator, among other things. System 100 includes one or more devices, such as user equipment (UE) 101 (e.g., a mobile phone), base station 102, web server 103, or secure server 104, which may be communicatively connected with each other. Security application 105 may be installed on UE 101 or other devices of system 100.

Figure 2:
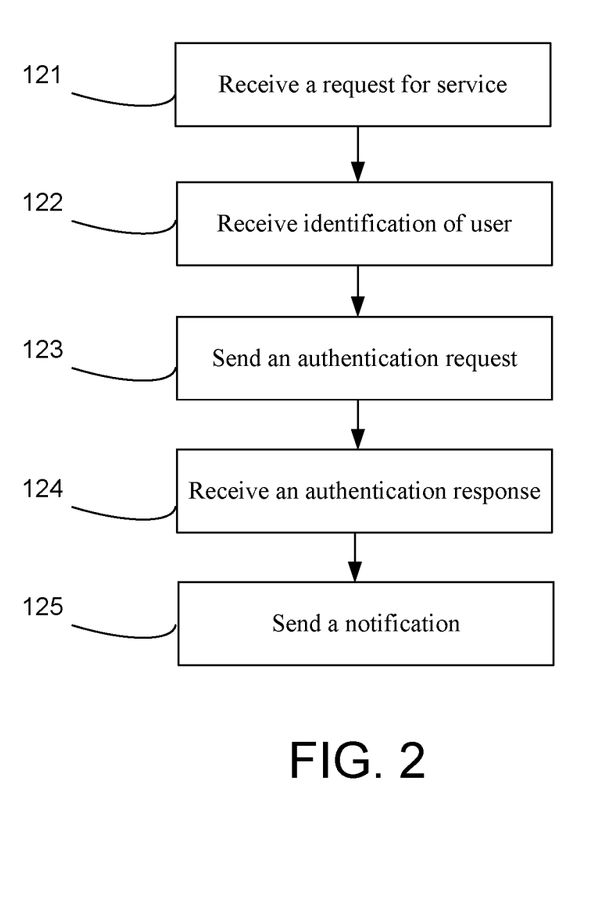
FIG. 2 illustrates an exemplary method for a core network authenticator.

FIG. 2 illustrates an exemplary method for a core network authenticator. At step 121, receive a request from user equipment 101, wherein the request may be for a web service. At step 122, obtain, by web server 103, an indication of an identification of a user associated with user equipment 101. The indication of identification may a user equipment identifier, user profile identifier, or a username and password combination. At step 123, based on the indication of identification of the user, send, by web server 103, an authentication request to secure server 104 of a communications provider of user equipment 101.

At step 124, in response to the authentication request, receiving, by web server 103, an authentication response from secure server 104 of the communications provider. Secure server 104 may authenticate the user based on current location information of user equipment 101 (e.g., location within minutes of the attempted web server access), historical location information of user equipment 101 (e.g., location within previous days, weeks, or months of the attempted web server access), or other current or historical information which may be associated with the interaction of user equipment 101 and the network of the communications provider. For example, the secure sever may send a short message service (SMS) text message to user equipment 101 that asks the current or historical location of user equipment 101. After secure server 104 receives a response to the SMS text message, secure server 104 determines whether authentication should be confirmed, and sends a response to web server 103.

At step 125, in response to the authentication response from secure server 104, sending, by web server 103, a notification, which may be to user equipment 101 or another device. The notification may provide information that indicates the acceptance or denial of authentication of the user's access attempt with web server 103. Alternatively, there may be a request for additional information that may be based on patterns associated with the behavior of user equipment 101. Example behaviors may include most used application for user equipment during a period, most visited websites during the period, or name of most commonly connected to WIFI access point within a period, among other things.

User equipment may have separately installed or have integrated into the operating system security application 105 that is connected with secure server 104 in the background. Security application 105 may be always "On" and may fully activate when the user is trying to access a service (e.g., financial website). Security application 105 may analyze user equipment 101 behavior for the few minutes prior to the service access attempt. Security application 105 may analyze user voice information (e.g., current or previously captured voice information). This type of secure application may be particularly helpful (and may be automatically triggered) when accessing user deemed or service provider deemed sensitive accounts (e.g., bank accounts). The disclosed system (e.g., secure server 104 or security application 105) may command actions on user equipment 101, such as turn off/on wireless or the cellular tower can monitor the process. In another example, the system can command user equipment 101 to cycle power to ensure no unwanted connections are present before connecting to the target website and also to ensure that security application 105 is in full control of user equipment 101 or user equipment (e.g., mobile phone) is not cloned.

There may be a radio frequency verifier integrated into the system. The radio frequency verifier may help ensure user equipment 101 is not compromised (e.g., cloned, etc.). Secure server 104 may provide security application 105 with a unique box (UB) that includes mathematical logic. Secure server 104 may send an input to the UB, and the output may be transmitted as an RF signal to base station 102. In a back-channel base station 102 may notify secure server 104 of the response for verification of user equipment 101. The UB may be installed in a way on user equipment 101 to be protected on the physical memory (e.g., any access to that segment in the memory (like in cloning), the UB may discard itself).

There may be a media access control (MAC) layer authentication integrated into the system. The MAC layer of base station 102 (e.g., a micro cell) may communicate with secure server 104 to provide an indication if the MAC layer sees an expected or unexpected checksum. Secure server 104 may command the MAC layer of user equipment 101 (in which the command may be via security application 105) to generate a packet that will fail the checksum by the MAC layer of base station 102 with a known value to secure server 104. Once base station 102 parses any incoming packet with the aforementioned checksum value, base station 102 may notify secure server 104, then secure server 104 may further authenticate the access attempt to web server 103. To reiterate there may be a forced change in the communication layers to verify the authenticity of the device—so the core server may give a secret command to the application on the phone that will force the phone to generate, purposely, malformed packet with wrong checksum so when the core sees this malformed checksum it would authenticate the device.

It is contemplated herein that methods, such as MAC layer authentication, RF verification, anomaly detection, other authentication methods, may be executed alone or in any combination. It is further contemplated that servers (e.g., websites) may generally connect with secure server 104 every time user equipment 101 connects to the service, in which there may be an automatic login or triggering of login credentials that are authenticated by secure server 104. Secure server 104 or security application 105 may keep track of location, for example, to determine when user equipment 101 is authenticated. In an example, locations may be based on the connection of user equipment 101 to the cell towers instead of GPS.

Figure 3:
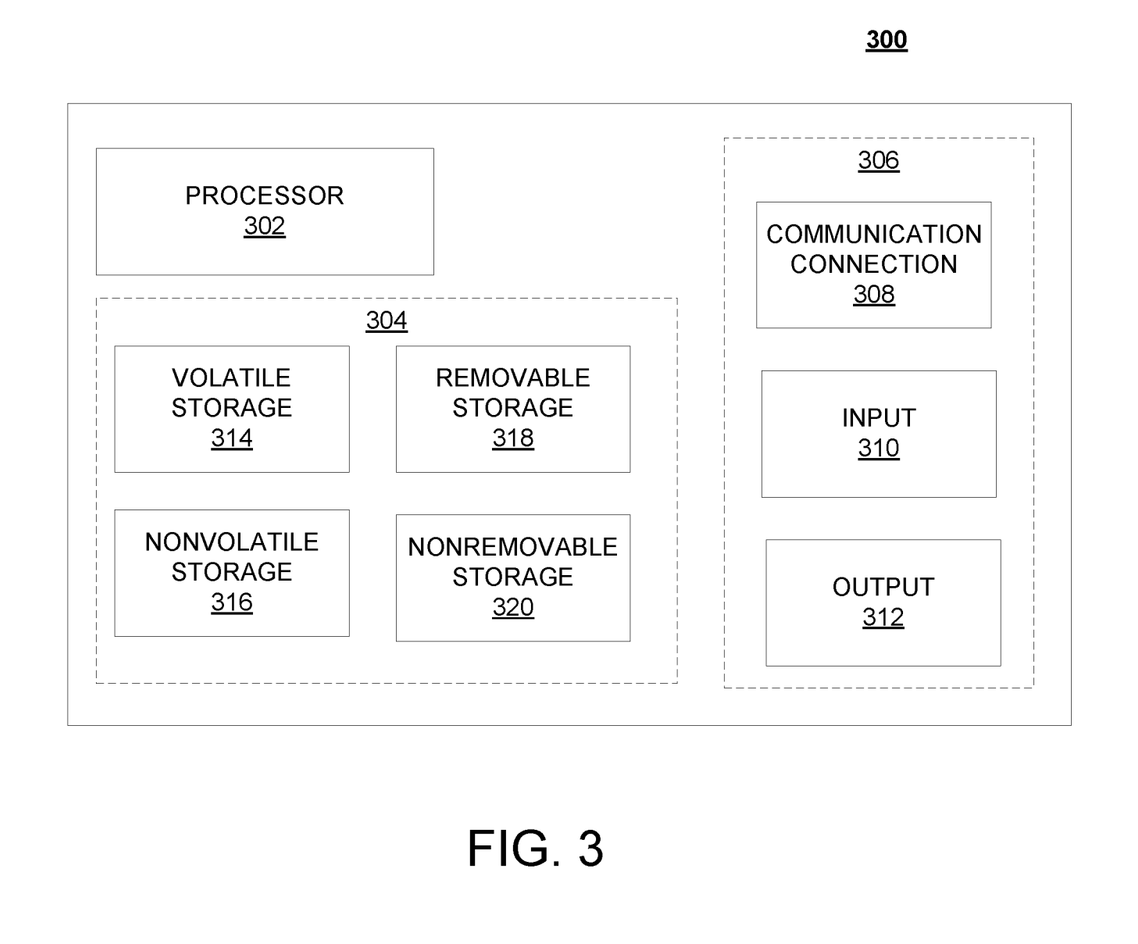
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
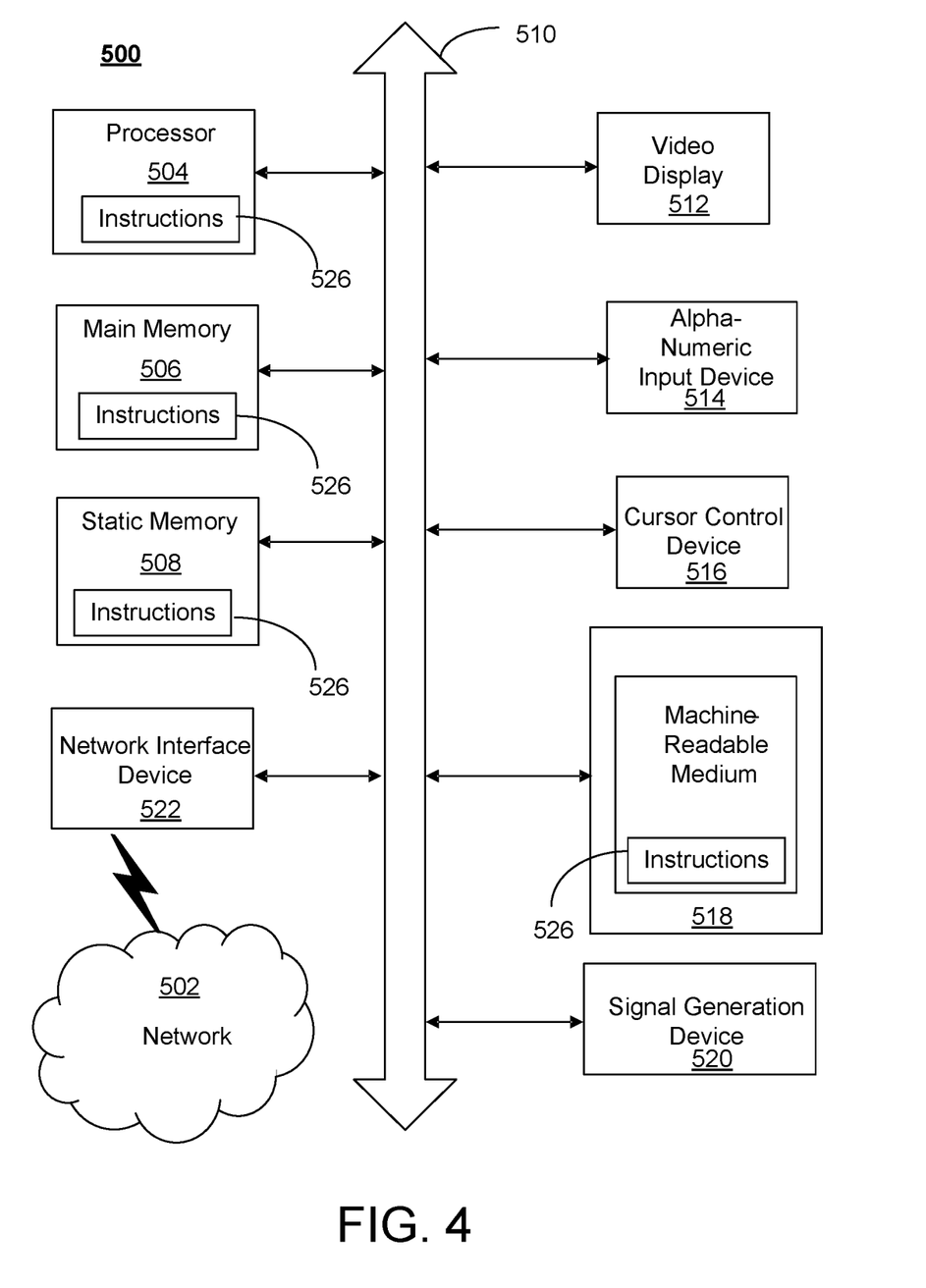
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 101, base station 102, web server 103, secures server 104, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which core network authenticator alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—core network authenticator—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for core network authenticator. A system is composed of integrated methods (network or device based) that may work together or separately. The system may provide secure authentication in the background. The authentication process may occur on multiple open system interconnection (OSI) layers independently to provide multi-gated system. A method, system, computer readable storage medium, or apparatus provides for receiving an indication of an identification of a user associated with a user equipment; sending an authentication request to secure server of a communications provider of the user equipment; receiving an authentication response from the secure server of the communications provider; and sending a notification to the user equipment. The secure server may authenticate the user based on information from a mobility management entity associated with the user equipment or another core device of the communications provider. The secure server may authenticate the user based on current or historical information of the user equipment that comprises location, operating system version, central processing unity type, chat behavior, or other UE related information. All combinations in this paragraph (including the removal or addition of steps) are contemplated in a manner that is consistent with the other portions of the detailed description.

What is claimed:

1. A method comprising:
providing, from a base station of a communications provider to a web server, an identifier of a user associated with a user equipment that is communicatively coupled with the base station;
based on the identifier, receiving, by a secure server of the communications provider from the web server, an authentication request;
sending, from the secure server to the user equipment, a command to generate and send a purposely generated malformed packet;
in response to the command, receiving, at the base station from the user equipment, the malformed packet;
performing, by the base station, a checksum associated with the malformed packet that causes a failure of the checksum with a known value;
providing, by the base station to the secure server, a notification of the failure of the checksum with the known value;
authenticating, by the secure server, the user equipment based on the failure caused by the malformed packet that is purposely generated by the user equipment; and
in response to the authentication request and the authenticating of the user equipment, providing, by the secure server to the web server, an authentication response indicating the user equipment has been authenticated, wherein
the authentication response from the secure server causes the web server to send a notification of authorization to access a service of the web server to the user equipment.

2. The method of claim 1, wherein the user equipment is a mobile phone, and the communications provider is a wireless service provider.

3. The method of claim 1, wherein the secure server sends the command to a security application of the user equipment to generate and send the purposely generated malformed packet.

4. The method of claim 1, wherein a media access control layer of the base station of the communications provider sends an indication that the checksum of the purposely generated malformed packet failed to the secure server.

5. The method of claim 1, wherein the secure server authenticates the user equipment based on current information of the user equipment that comprises location, operating system version, central processing unit type, or chat behavior.

6. The method of claim 1, wherein the secure server authenticates the user equipment based on historical information of the user equipment that comprises location, operating system version, central processing unit type, or chat behavior.

7. The method of claim 1, wherein the secure server authenticates the user equipment based on information from a mobility management entity associated with the user equipment.

8. A system comprising:
- a base station of a communications provider, wherein the base station comprises a base station processor; and
- a secure server of the communications provider, wherein the secure server comprises a secure server processor;
- wherein the base station processor is configured to provide, to a web server, an identifier of a user associated with a user equipment that is communicatively coupled with the base station,
- wherein, based on the identifier, the secure server processor is configured to receive, from the web server, an authentication request,
- wherein the secure server processor is configured to send, to the user equipment, a command to generate and send a purposely generated malformed packet,
- wherein, in response to the command, the base station processor is configured to receive, from the user equipment, the malformed packet,
- wherein the base station processor is configured to perform a checksum associated with the malformed packet that causes a failure of the checksum with a known value,
- wherein the base station processor is configured to provide, to the secure server, a notification of the failure of the checksum with the known value,
- wherein the secure server processor is configured to authenticate the user equipment based on the failure caused by the malformed packet that is purposely generated by the user equipment,
- wherein, in response to the authentication request and an authentication of the user equipment, the secure server processor is configured to provide, to the web server, an authentication response indicating the user equipment has been authenticated, and
- wherein the web server, according to the authentication response from the secure server, is configured to send a notification of authorization to access a service of the web server to the user equipment.

9. The system of claim 8, wherein the secure server processor is configured to send the command to a security application of the user equipment to generate and send the purposely generated malformed packet.

10. The system of claim 8, wherein the identifier is a username and password combination.

11. The system of claim 8, wherein the communications provider is a wireless service provider.

12. The system of claim 8, wherein the secure server processor is configured to authenticate the user equipment based on current information of the user equipment that comprises location, operating system version, central processing unit type, or chat behavior, and wherein the user equipment creates the purposely generated malformed packet.

13. The system of claim 8, wherein the secure server processor is configured to authenticate the user equipment based on historical information of the user equipment that comprises location, operating system version, central processing unit type, or chat behavior.

14. The system of claim 8, wherein the secure server processor is configured to authenticate the user equipment based on information from a mobility management entity associated with the user equipment.

15. A non-transitory, computer readable storage medium storing computer executable instructions that when executed by a base station processor of a base station and a secure server processor of a secure server of a processing system of a communications provider cause said base station processor and said secure server processor of the processing system to effectuate operations comprising:
- providing, from the base station processor to a web server, an identifier of a user associated with a user equipment that is communicatively coupled with the base station;
- based on the identifier, receiving, by a secure server processor from the web server, an authentication request;
- sending, from the secure server processor to the user equipment, a command to generate and send a purposely generated malformed packet;
- in response to the command, receiving, at the base station processor from the user equipment, the malformed packet;
- performing, by the base station processor, a checksum associated with the malformed packet that causes a failure of the checksum with a known value;
- providing, by the base station processor to the secure server, a notification of the failure of the checksum with the known value;
- authenticating, by the secure server processor, the user equipment based on the failure caused by the malformed packet that is purposely generated by the user equipment; and
- in response to the authentication request and the authenticating of the user equipment, providing, by the secure server processor to the web server, an authentication response indicating the user equipment has been authenticated, wherein the authentication response from the secure server processor causes the web server to send a notification of authorization to access a service of the web server to the user equipment.

16. The non-transitory, computer readable storage medium of claim 15, wherein the user equipment is a mobile phone and the user equipment creates the purposely generated malformed packet utilizing a security application.

17. The non-transitory, computer readable storage medium of claim 15, wherein the identifier is a username and password combination.

18. The non-transitory, computer readable storage medium of claim 15, wherein the communications provider is a wireless service provider.

19. The non-transitory, computer readable storage medium of claim 15, wherein the secure server processor authenticates the user equipment based on historical information of the user equipment that comprises operating system version, central processing unit type, or chat behavior.

20. The non-transitory, computer readable storage medium of claim 15, wherein the secure server processor authenticates the user equipment based on current information of the user equipment that comprises operating system version, central processing unit type, or chat behavior.

* * * * *

UNITED STATES PATENT AND TRADEMARK OFFICE
CERTIFICATE OF CORRECTION

| | | |
|---|---|---|
| PATENT NO. | : 12,348,957 B2 | Page 1 of 1 |
| APPLICATION NO. | : 17/499391 | |
| DATED | : July 1, 2025 | |
| INVENTOR(S) | : Soryal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 336 days.

Signed and Sealed this
Sixteenth Day of December, 2025

John A. Squires
*Director of the United States Patent and Trademark Office*